United States Patent
Morgan

(10) Patent No.: US 10,263,928 B2
(45) Date of Patent: Apr. 16, 2019

(54) SYSTEMS AND METHODS FOR RECORDING AND BROADCASTING AUDIO MESSAGES BETWEEN USERS

(71) Applicant: EZTALK, LLC, Manchester, NH (US)

(72) Inventor: Christopher Morgan, Manchester, NH (US)

(73) Assignee: EZTALK, LLC, Manchester, NH (US)

( * ) Notice: Subject to any disclaimer, the term of this patent is extended or adjusted under 35 U.S.C. 154(b) by 0 days.

(21) Appl. No.: 15/882,315

(22) Filed: Jan. 29, 2018

(65) Prior Publication Data

US 2018/0241706 A1 Aug. 23, 2018

Related U.S. Application Data

(60) Provisional application No. 62/462,203, filed on Feb. 22, 2017.

(51) Int. Cl.
| | | |
|---|---|---|
| *H04L 12/58* | (2006.01) | |
| *G11B 20/10* | (2006.01) | |
| *G06F 3/16* | (2006.01) | |

(52) U.S. Cl.
CPC .............. *H04L 51/10* (2013.01); *G06F 3/162* (2013.01); *G11B 20/10527* (2013.01); *H04L 51/14* (2013.01); *H04L 51/32* (2013.01); *G11B 2020/10546* (2013.01)

(58) Field of Classification Search
CPC ....................................................... H04L 51/10
USPC ........................................................ 715/727
See application file for complete search history.

(56) References Cited

U.S. PATENT DOCUMENTS

| | | | |
|---|---|---|---|
| 6,826,407 B1 | 11/2004 | Helferich | |
| 8,744,860 B2 * | 6/2014 | Chang | ...................... H04L 51/32 704/270 |
| 8,917,849 B2 | 12/2014 | Weiner | |
| 9,237,237 B2 | 1/2016 | Odinak | |
| 9,451,092 B2 | 9/2016 | Qureshi et al. | |
| 9,772,813 B2 * | 9/2017 | Miller | ................ H04N 21/4788 |
| 9,860,384 B2 | 1/2018 | Odinak | |
| 9,990,655 B2 * | 6/2018 | MacTiernan | ............ G06F 16/68 |
| 10,055,087 B2 * | 8/2018 | Choi | ................... G06F 3/04817 |
| 2014/0344749 A1 * | 11/2014 | Choi | .................... G06F 3/04817 715/780 |
| 2015/0046267 A1 * | 2/2015 | MacTiernan | ............ G06F 16/68 705/14.66 |
| 2016/0294799 A1 * | 10/2016 | Miller | ................. H04N 21/4788 |
| 2016/0294894 A1 * | 10/2016 | Miller | ............... G06F 16/24578 |

(Continued)

*Primary Examiner* — William D Titcomb
(74) *Attorney, Agent, or Firm* — Armstrong Teasdale LLP

(57) ABSTRACT

A computer system for recording and broadcasting audio messages between users configured to (a) store a plurality of channel data for a plurality of channels; (b) receive, from a channel owner computer device associated with a channel owner, a first audio message; (c) store, in the database, the first audio message in a first channel associated with the channel owner; (d) transmit a first notification to one or more subscriber computer devices of the first channel, where the first notification includes the first location of the first audio message; (e) receive, from a subscriber computer device associated with a subscriber of the first channel, a second audio message in response to the first audio message; and (f) transmit a second notification to the channel owner computer device wherein the second notification includes a second location of the second audio message.

20 Claims, 6 Drawing Sheets

(56) References Cited

U.S. PATENT DOCUMENTS

2017/0331957 A1 11/2017 Talwar et al.
2018/0109732 A1* 4/2018 Jang .................... G06F 3/04817

* cited by examiner

SYSTEMS AND METHODS FOR RECORDING AND BROADCASTING AUDIO MESSAGES BETWEEN USERS

RELATED APPLICATIONS

This application claims priority to U.S. Provisional Patent Application No. 62/462,203, filed Feb. 22, 2017, entitled "A DIGITAL ENGAGEMENT PLATFORM FOR RECORDING AND BROADCASTING AUDIO MESSAGES BETWEEN USERS", the entire contents and disclosure of which are hereby incorporated by reference herein in their entirety.

FIELD OF THE INVENTION

The present disclosure relates to systems and methods for recording and broadcasting audio messages between users and, more particularly, a digital engagement platform for recording and broadcasting audio messages between users.

BACKGROUND

Many people engaged in discussions about sports, politics, religion, and other topics prefer to engage through audio/voice rather than text. While some social media applications include an audio component, many audio applications limit the size of the audience and are organized based on the conversation and current contributors rather than allowing for topic-centered, real-time discussion with an audience of unlimited size. While current social media applications allow users to post and share multimedia content, there is a need for a software platform optimized for recording and sharing short audio messages with large groups in an organized and topical fashion.

BRIEF SUMMARY

In one aspect, a computer system for recording and broadcasting audio messages between users is provided. The computer system includes at least one processor in communication with at least one memory device including a database. The at least one processor is programmed to store, in the database, a plurality of channel data for a plurality of channels. Each channel is associated with a channel owner and one or more subscribers. The plurality of channel data includes data about the channel owner computer device associated with a channel owner and one or more subscriber computer devices associated with the one or more subscribers. The at least one processor is also programmed to receive, from a channel owner computer device associated with the channel owner, a first audio message, convert the first audio message for storage, and store, in the database, the first audio message in a first channel of the plurality of channels in a first location. The first channel is associated with the channel owner. The at least one processor is further programmed to generate a first notification about the first audio message including the first location of the first audio message and transmit the first notification to the one or more subscriber computer devices of the first channel. The first notification includes the first location of the first audio message. Moreover, the at least one processor is programmed to receive, from a subscriber computer device associated with a subscriber of the first channel, a second audio message in response to the first audio message and transmit a second notification to the channel owner computer device wherein the second notification includes a second location of the second audio message. The computer system may have additional, less, or alternate functionality, including that discussed elsewhere herein.

In another aspect, a computer-implemented method for computer-implemented method for recording and broadcasting audio messages between users is provided. The method is implemented on a computer system including at least one processor in communication with at least one memory device including a database. The method includes storing, in the database, a plurality of channel data for a plurality of channels. Each channel is associated with a channel owner and one or more subscribers. The plurality of channel data includes data about the channel owner computer device associated with a channel owner and one or more subscriber computer devices associated with the one or more subscribers. The method also includes receiving, from a channel owner computer device associated with the channel owner, a first audio message, converting the first audio message for storage, and storing, in the database, the first audio message in a first channel of the plurality of channels in a first location. The first channel is associated with the channel owner. The method further includes generating a first notification about the first audio message including the first location of the first audio message and transmitting the first notification to the one or more subscriber computer devices of the first channel. The first notification includes the first location of the first audio message. Moreover, the method includes receiving, from a subscriber computer device associated with a subscriber of the first channel, a second audio message in response to the first audio message and transmitting a second notification to the channel owner computer device wherein the second notification includes a second location of the second audio message. The method may have additional, less, or alternate functionality, including that discussed elsewhere herein.

In at least one further aspect, at least one non-transitory computer-readable storage media having computer-executable instructions embodied thereon may be provided. When executed by at least one processor, the computer-executable instructions may cause the processor to store, in the database, a plurality of channel data for a plurality of channels. Each channel is associated with a channel owner and one or more subscribers. The plurality of channel data includes data about a channel owner computer device associated with the channel owner and one or more subscriber computer devices associated with the one or more subscribers. The computer-executable instructions may also cause the processor to receive, from a channel owner computer device associated with the channel owner, a first audio message, convert the first audio message for storage, and store, in the database, the first audio message in a first channel of the plurality of channels in a first location. The first channel is associated with the channel owner. The computer-executable instructions may further cause the processor to generate a first notification about the first audio message including the first location of the first audio message and transmit the first notification to the one or more subscriber computer devices of the first channel. The first notification includes the first location of the first audio message. Moreover, the computer-executable instructions cause the processor to receive, from a subscriber computer device associated with a subscriber of the first channel, a second audio message in response to the first audio message and transmit a second notification to the channel owner computer device wherein the second notification includes a second location of the second audio message. The computer-executable instructions may have additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
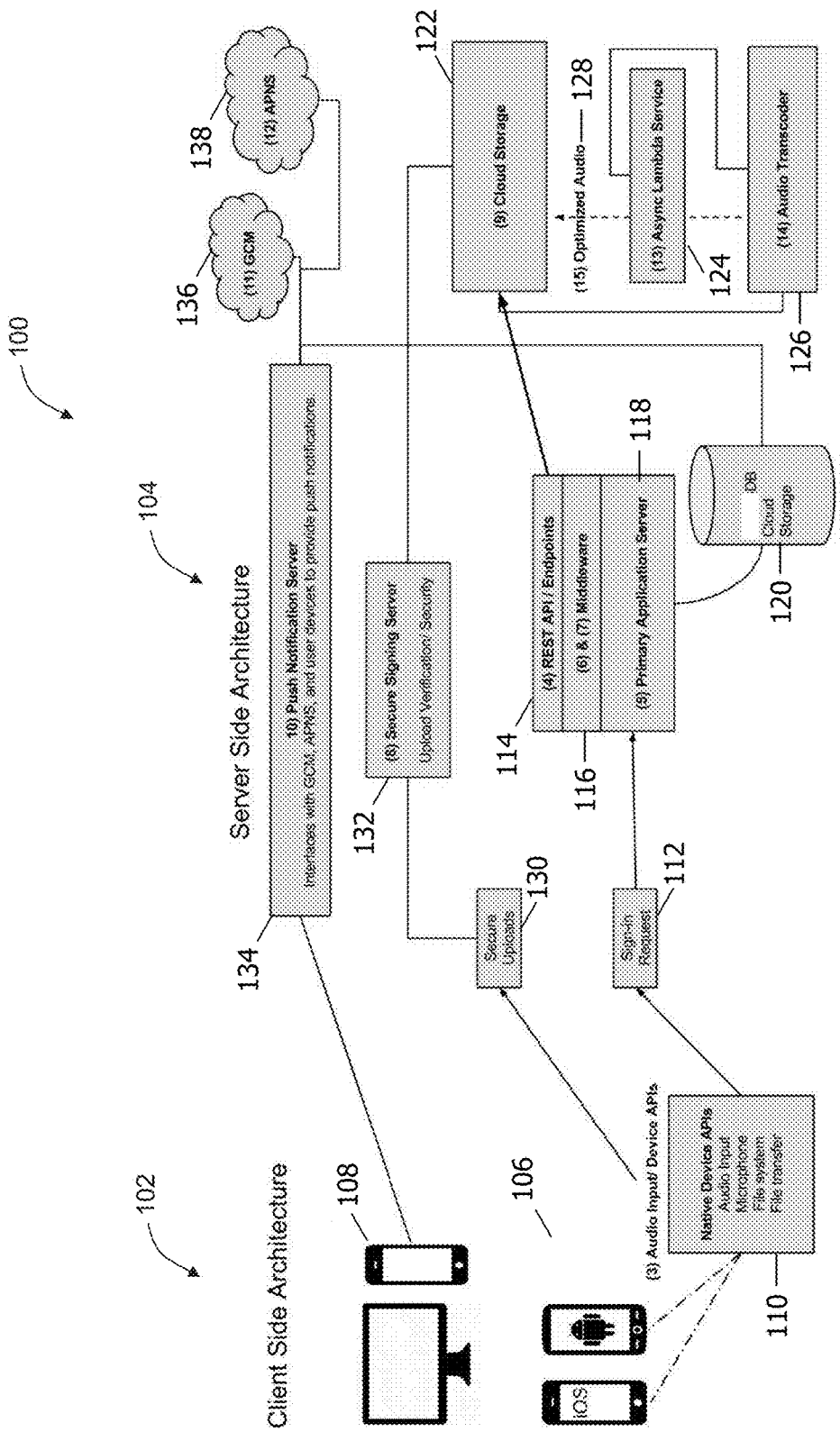
FIG. 1 illustrates a network architecture-based flow chart of an exemplary process of recording and broadcasting audio messages between users, in accordance with one aspect of the present disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, systems and methods for recording and broadcasting audio messages between users. In one exemplary embodiment, the process may be performed by an audio management ("AM") computer device. In the exemplary embodiment, the AM computer device may be in communication with a plurality of channel owner computer devices and a plurality of subscriber computer devices, or a plurality of broadcaster computer devices and the plurality of receiver computer devices.

As stated above, many people who engage in discussions about sports, politics, religion, and other topics prefer to engage through audio/voice rather than text. While current social media applications allow users to post and share multimedia content, there is currently no software platform optimized for recording and sharing short audio messages with large groups in an organized, topical fashion. The invention claimed here solves this problem.

The application disclosed herein differs from and is an improvement over what currently exists. There is currently no software platform optimized for recording and sharing short audio messages with large groups in a highly organized, topical fashion.

Many existing applications that offer an audio component have basic organization. The application disclosed herein describes an organization and structure necessary to have complete, chronological discussions around the same topic. These known applications are further deficient because they group recordings in a manner too fragmented to maintain a cohesive conversation with large audiences.

The application described herein prompts users to select a specific category (channel, also known as a station) before uploading their audio content. Upon uploading, the application's server-side architecture compresses, converts, and optimizes audio for playback on the specified category (channel) for any internet-connected computer or device.

This application can produce user generated audio content as well as textual content. Taken together, the application can produce entire communities of engaged users around specific topics of discussions creating content. This content can be indexed and highly beneficial to businesses, organizations, and entities that are interested in understanding the voice of these specific communities or content around a specific subject.

The software application acts as a recording device and visual interface to organize, search, and discover audio content produced by other users. In the exemplary embodiment, all technical components including, application program interfaces (API's), storage servers, databases, compression servers, etc., work together to transcode and compress audio files so they can be stored efficiently. The application then provides a user interface which interacts with the database to allow users to efficiently search, discover, and interact with audio content. A notification server interacts with specific devices to alert a user when a new audio broadcast has been delivered.

For the purposes of this application, a channel owner is a user who is the owner or contributor to an audio channel. A subscriber is an individual user who signed up to receive notifications to listen to updates to the channel. A broadcaster is a user who recorded an audio message. A broadcaster may be a channel owner or a subscriber who is responding to an audio message on a channel. A receiver is a user that is receiving and/or listening to a previously created audio message created by a different user, including a subscriber and a channel owner.

In the exemplary embodiment, a broadcaster opens the application from a mobile device or desktop browser capable of receiving audio input. The application allows broadcaster to record raw audio content and broadcast that content with a specific tag. Upon choosing to broadcast their recording, the audio file along with specific user metadata and an audio tag (information about the file's topical hierarchy) are uploaded to a specific (based on a broadcaster selected tag) endpoint on the representational state transfer (REST) API which is running on the Primary Application Server. The server uses middleware to store user metadata in a central NoSQL database, while separate cryptographic middleware generates a unique identifier and stores reference to what will be the file's URL. Simultaneously, the server submits a request to a separate server for secure-signing. The secure signing server verifies the file uploader's identity and responds with a token used to complete uploading to the cloud-based file storage system.

Once the audio file reaches the file system, two things happen substantially simultaneously. First, the web server sends a custom push notification (depending on the specific REST API endpoint triggered) to the push notification server. And second, the push notification server interacts with one or more push notification services, for example Google® Cloud Messaging (GCM) (Google is a registered trademark of Google LLC) and Apple® Push Notification Service (APNS) (Apple is a registered trademark of Apple Inc.) in order to authenticate.

From a subscriber's point of view, the subscriber accesses the software application using a compatible device which offers audio input/output capabilities. Upon accessing the software, the subscriber must register to create an account & profile. Once registered, the subscriber is presented with Stations which group audio discussions together by topic. The subscriber can enter and/or subscribe to these channels to stay up-to-date on posts within.

The subscriber may also act as a broadcaster and can record audio clips of up to a certain predefined length. Recorded audio clips may be tagged for a specific channel/topic and can be previewed before posting. If desired, the broadcaster can post the recorded audio clip to the previously defined channel. Otherwise, the sorting program logic will group the audio in the most appropriate category. The broadcaster can repeat this action as desired.

Once the audio clip is uploaded, receivers can play that clip through any device and reply by audio or text. If another receiver replies to an audio clip, the original broadcaster that posted is notified of the action through their device. Subscribers to the channel will also receive a notification. These actions can be repeated as desired to create audio discussions within specific channels between users.

The application may be used for discussions for politics, news, media, fashion, medicine, or any other subjects that lends itself to an audio discussion format. The application can also produce user generated audio content as well as textual content. Taken together, the application can support entire communities of engaged users around specific topics of discussions creating content. This content can be indexed and highly beneficial to businesses, organizations, and entities that are interested in understanding the voice of these specific communities or content around a specific subject.

The methods and systems described herein may be implemented using computer programming or engineering techniques including computer software, firmware, hardware, or any combination or subset therefor. At least one of the technical problems addressed by this system includes: (i) providing a system for organizing audio messages; (ii) allowing users to respond to audio messages; (iii) keeping users up to date with available audio messages; and (iv) allowing public and private audio message conversations.

The technical effect of the systems and methods described herein is achieved by performing at least one of the following steps: (i) storing, in a database, a plurality of channel data for a plurality of channels, where each channel is associated with a channel owner and one or more subscribers, and where the plurality of channel data includes data about a channel owner computer device associated with the channel owner and one or more subscriber computer devices associated with the one or more subscribers; (ii) receiving, from the channel owner computer device, a first audio message; (iii) converting the first audio message for storage; (iv) storing, in the database, the first audio message in a first channel of the plurality of channels in a first location, wherein the first channel is associated with the channel owner; (v) generating a first notification about the first audio message including the first location of the first audio message; (vi) transmitting the first notification to the one or more subscriber computer devices of the first channel; (vii) receiving, from a subscriber computer device associated with a subscriber of the first channel, a second audio message in response to the first audio message; (viii) transmitting a second notification to the channel owner computer device wherein the second notification includes a second location of the second audio message; (ix) where the second audio message is a public message, transmitting the second notification to the one or more subscriber computer devices of the first channel and the channel owner computer device, where the second notification includes the second location of the second audio message; (x) receiving the first audio message in a first audio format; (xi) converting the first audio message into a second audio format; (xii) storing the first audio message in the second audio format; (xiii) receiving a third audio message in response to the second audio message from one of the channel owner computer device and one or more the subscriber computer devices; (xiv) transmitting a third notification to at least one of the one or more subscriber computer devices of the first channel and the channel owner computer device, where the third notification includes a third location of the third audio message; (xv) generating a first token for the first audio message based on the first location and the metadata associated with the first audio message; (xvi) generating an individual notification for each subscriber of the one or more subscribers of the first channel including a unique version of the first token based on a subscriber computer device associated with the corresponding subscriber, where the unique version of the first token allows the corresponding subscriber to access the first audio message; and (xvii) transmitting the unique version of the first token in the first notification.

Exemplary Process for Recording and Broadcasting Audio Messages Between Users

FIG. 1 illustrates a network architecture-based flow chart of an exemplary process 100 of recording and broadcasting audio messages between users, in accordance with the present disclosure. In the exemplary embodiment, process 100 is performed by an audio management ("AM") system that includes a client side architecture 102 and a server side architecture 104. In the exemplary embodiment, the AM system is in communication with a plurality of broadcaster computer devices 106 and a plurality of receiver computer devices 108. In this embodiment, the AM system receives audio messages from the plurality of broadcaster computer devices 106 and transmits notifications about the audio messages to the plurality of receiver computer devices 108.

In the exemplary embodiment, a broadcaster associated with a broadcaster computer device 106 uses a native device API 110 to record a raw audio message using an audio input of the broadcaster computer device 106. When the broadcaster decides to broadcast the audio message, the broadcaster signs in 112 to a primary application server 118 to upload the raw audio message along with user-specific metadata and an audio tag to a specific endpoint 114 on the REST API, which is executing on the primary application server 118. The user-specific metadata contains information about the broadcaster that uploaded the data. The audio tag contains information about the audio message's topical hierarchy. For example, is the audio message a beginning of a new thread (or sub-channel)? Is the message a response to someone else's audio message? Is the audio message public or private?

The server 118 uses middleware 116 to store the user-specific metadata in a database 120. In some embodiments, the server 118 requests a secure sign-in 112 to secure signing server 132 to securely upload 130 the raw audio message. In these embodiments, the secure signing server 132 verifies the file uploader's identity. In these embodiments, the secure signing server 132 generates a token that is stored with the audio message in cloud storage 122.

After the raw audio message is uploaded, the raw audio file is compressed, converted, and optimized for playback. In the exemplary embodiment, an asynchronous lambda function 124 (or other monitoring system) monitors the cloud storage 122 for new uploads. When a new upload is detected, an audio transcoder 126 converts the audio file into multiple different formats for different device-compatible audio formats. The files are further optimized 128 for playback and are stored in the cloud storage 122.

While the audio message is being converted, the primary application server 118 instructs a push notification server 134 to transmit a notification message to the appropriate receiver computer devices 108. In the exemplary embodiment, the push notification server 134 works with GCM 136, APNS 138, and any other device-specific notification services.

QUESTIONS TO THE INVENTOR: Do you have additional information about the token process and how it interacts with the database? Is there anything special about the notifications?

Figure 2:
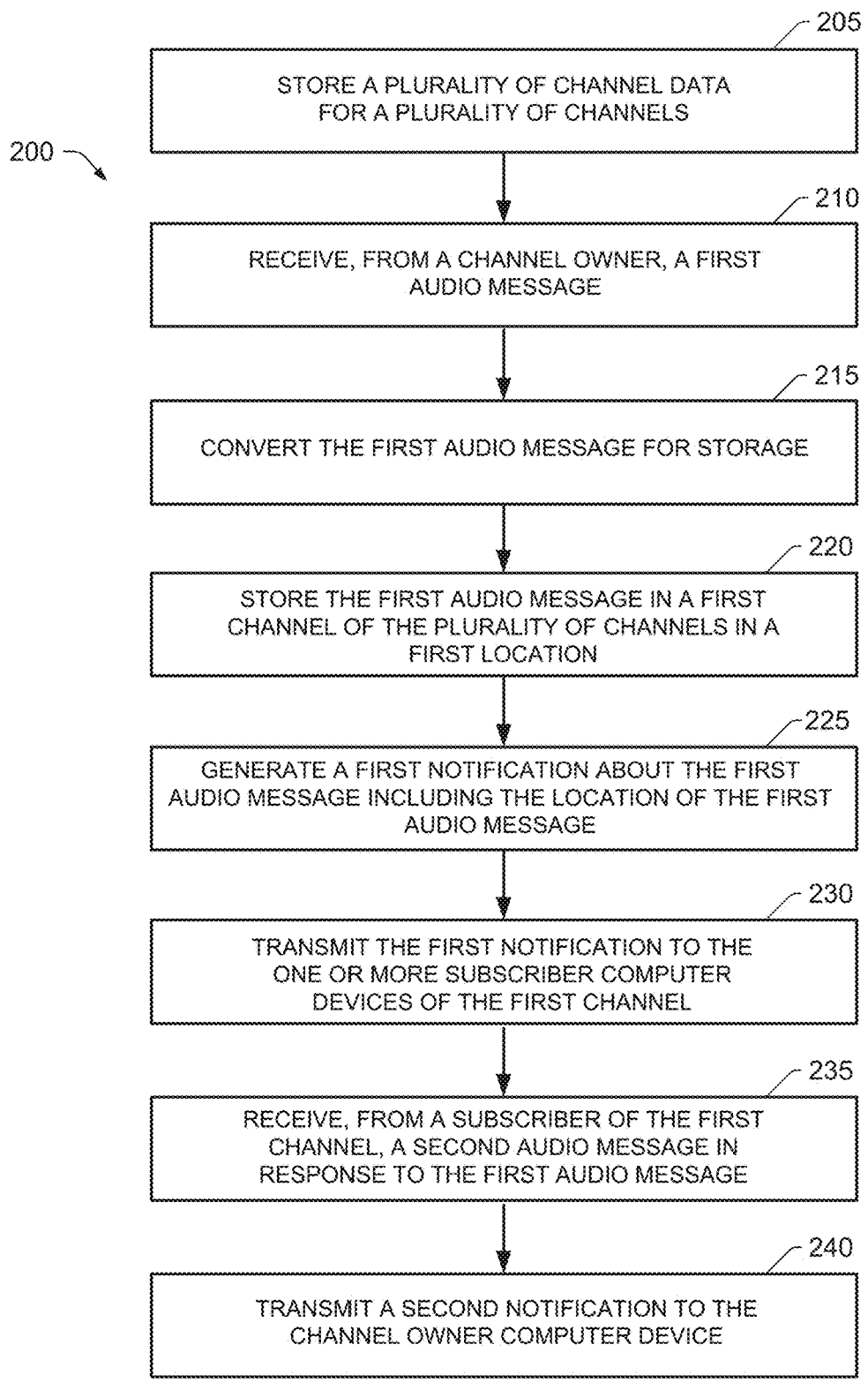
FIG. 2 illustrates a flow chart of an exemplary computer-implemented process for one aspect of the process of recording and broadcasting audio messages between users as shown in FIG. 1, in accordance with one aspect of the present disclosure.

Exemplary Computer-Implemented Method for Recording and Broadcasting Audio Messages Between Users FIG. 2 illustrates a flow chart of an exemplary computer implemented process 200 for one aspect of process 100 for recording and broadcasting audio messages between users as shown in FIG. 1. Process 200 may be implemented by a computing device, for example audio management ("AM") computer device 310 (shown in FIG. 3). In the exemplary embodiment, AM computer device 310 is in communication with a channel owner computer device 325 (shown in FIG. 3) and a plurality of subscriber computer devices 305 (shown in FIG. 3).

In the exemplary embodiment, AM computer device 310 stores 205, in the database 320 (shown in FIG. 3), a plurality of channel data for a plurality of channels. Each of the channels is associated with a channel owner and one or more subscribers, where the channel owner is the owner or contributor of the channel and the subscribers follow the channel. The plurality of channel data includes data about a channel owner computer device 325 (shown in FIG. 3) associated with the channel owner. The plurality of channel data also includes information about one or more subscriber computer devices 305 (shown in FIG. 3) associated with the one or more subscribers.

In the exemplary embodiment, AM computer device 310 receives 210, from the channel owner computer device 305, a first audio message. In the exemplary embodiment, the received first audio message is a raw message. AM computer device 310 converts 215 the first audio message for storage. For example, AM computer device 310 may receive 210 the first audio message in a first format and convert the first audio message into a second format. In some embodiments, AM computer device 310 generates a plurality of audio files for the first audio message, where each file is in a different format for playback on a different type of audio device. In some further embodiment, AM computer device 310 also compresses the first audio message for storage. In still further embodiments, AM computer device 310 optimize the first audio message for audio quality prior to storing.

In the exemplary embodiment, AM computer device 310 stores 220, in the database 320, the first audio message in the first channel of the plurality of channels in a first location, where the first channel is associated with the channel owner.

In the exemplary embodiment, AM computer device 310 generates 225 a first notification about the first audio message including the first location of the first audio message. In some embodiments, the first location is stored as a link to retrieve the first audio message. AM computer device 310 transmits 230 the first notification to the one or more subscriber computer devices 305 of the first channel.

In the exemplary embodiment, AM computer device 310 receives 235, from a subscriber computer device 305 associated with a subscriber of the first channel, a second audio message in response to the first audio message. AM computer device 310 converts and stores the second audio message in database 320 and links the second audio message to the first audio message. For example, the channel owner uploaded the first audio message about a sport's team. The subscriber received the notification, listened to the first audio message based on the notification, and submitted an audio message as a response to the first audio message. The subscriber may choose to have the message be either public or private. If the message is public, then the audio message is publically available and AM computer device 310 transmits 240 a second notification including the location of the second audio message to the channel owner computer device 325 and the rest of the subscriber computer devices 305 that are associated with the first channel. If the message is private, AM computer device 310 transmits the second notification just to the channel owner computer device 325. Other subscribers may respond to either the first message or the second message, if it is public. There may be multiple messages associated with each audio message. Furthermore, a channel owner and a subscriber may have a conversation including multiple audio messages between themselves, where the audio messages are private so that only the channel owner and subscriber may listen to the audio messages.

In further embodiments where the messages are public, AM computer device 310 receives a third audio message in response to the second audio message from either the channel owner computer device 325 or one or more the subscriber computer devices 305. AM computer device 310 converts and stores the third audio message. AM computer device 310 transmits a third notification to everyone on the first channel except the broadcaster of the third audio message.

In still further embodiments, the first audio message includes metadata. In these embodiments, AM computer device 310 generates a first token for the first audio message based on the first location and the metadata associated with the first audio message. AM computer device 310 generates an individual notification for each subscriber of the one or more subscribers of the first channel including a unique version of the first token based on a subscriber computer device 305 associated with the corresponding subscriber.

The unique version of the first token allows the corresponding subscriber to access the first audio message. In the some embodiments, AM computer device 310 transmits the unique version of the first token in the first notification.

In other embodiments, AM computer device 310 stores a plurality of sub-channels associated with the first channel. Each sub-channel may represent a different topic or the beginning of a new series of audio messages. For example, one sub-channel may be devoted to discussion of a particular sports team and another sub-channel may be devoted to discussion of a particular movie. In these embodiments, AM computer device 310 stores the first audio message in one of the plurality of sub-channels based on at least one of the metadata and a user selection.

In these embodiments, each of the subscriber computer devices 305 are configured to display the first notification to the associated subscriber. The subscriber computer devices 305 are further configured to receive, from the associated subscriber, a selection of the first audio message and retrieve the first audio message from the database 320. The subscriber computer devices 305 are also configured to play, via an audio device associated with the corresponding subscriber computer device 305, the first audio message.

Exemplary Computer Network

Figure 3:
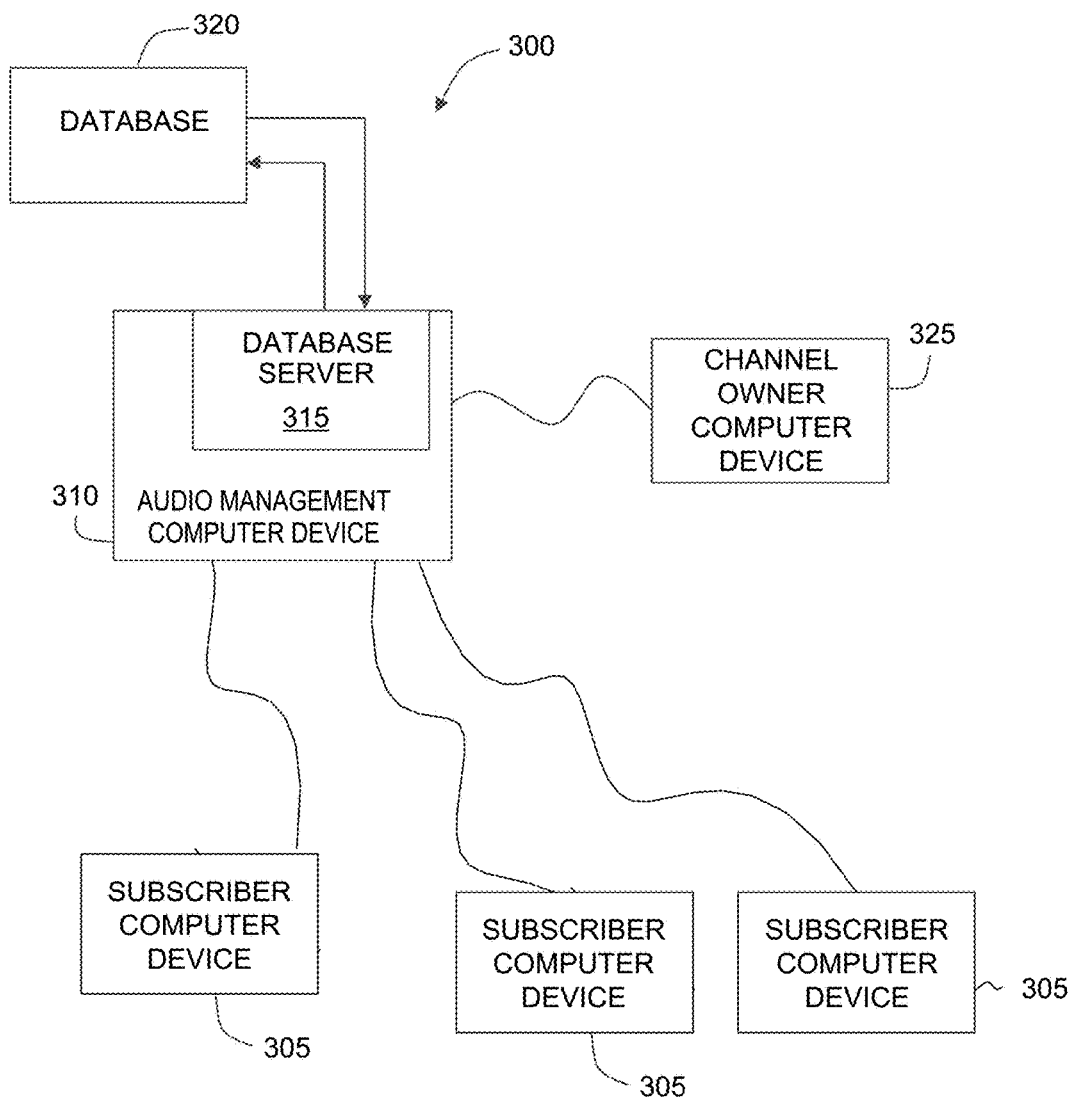
FIG. 3 illustrates a simplified block diagram of an exemplary computer system for implementing the processes shown in FIGS. 1 and 2.

FIG. 3 depicts a simplified block diagram of an exemplary computer system 300 for implementing processes 100 and 200 shown in FIGS. 1 and 2, respectively. In the exemplary embodiment, computer system 300 may be used for recording and broadcasting audio messages between users. As described below in more detail, an audio management ("AM") computer device 310 may be configured to (a) store a plurality of channel data for a plurality of channels; (b) receive, from a channel owner computer device associated with a channel owner, a first audio message; (c) store, in a database, the first audio message in a first channel associated with the channel owner; (d) transmit a first notification to one or more subscriber computer devices of the first channel, where the first notification includes the first location of the first audio message; (e) receive, from a subscriber computer device associated with a subscriber of the first channel, a second audio message in response to the first audio message; and (f) transmit a second notification to the channel owner computer device wherein the second notification includes a second location of the second audio message.

In the exemplary embodiment, channel owner computer devices 325 are computers that include a web browser or a software application, which enables channel owner computer devices 325 to access remote computer devices, such as AM computer device 310, using the Internet or other network. More specifically, channel owner computer devices 325 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Channel owner computer devices 325 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In the exemplary embodiment, channel owner computer devices 325 include a microphone and an audio output device, such as a speaker.

In the exemplary embodiment, subscriber computer devices 305 are computers that include a web browser or a software application, which enables subscriber computer devices 305 to access remote computer devices, such as AM computer device 310, using the Internet or other network. More specifically, subscriber computer devices 305 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Subscriber computer devices 305 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In the exemplary embodiment, subscriber computer devices 305 execute an application to allow communication with the AM computer device 310. In the exemplary embodiment, subscriber computer devices 305 include, or are in communication with, at least an audio output device. In some embodiments, subscriber computer devices include a microphone.

A database server 315 may be communicatively coupled to a database 320 that stores data. In one embodiment, database 320 may include channel information, subscriber information, audio messages, and tokens. In the exemplary embodiment, database 320 may be stored remotely from AM computer device 310. In some embodiments, database 320 may be decentralized. In the exemplary embodiment, the user may access database 320 via channel owner computer device 325 by logging onto AM computer device 310, as described herein. In the exemplary embodiment, database 320 may be similar to database 120 and cloud storage 122 (both shown in FIG. 1).

AM computer device 310 may be communicatively coupled with one or more channel owner computer devices 325 and one or more subscriber computer devices 305. In some embodiments, AM computer device 310 may be associated with, or is part of a computer network associated with an audio messaging system for a hospital or mental health facility. More specifically, AM computer device 310 is communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. AM computer device 310 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In the exemplary embodiment, AM computer device 310 hosts an application or website that allows users to access the functionality described herein. In some further embodiments, channel owner computer device 325 and subscriber computer devices 305 include an application that facilitates communication with AM computer device 310. In some embodiments, AM computer device includes one or more of the functionalities of primary application server 118, secure signing server 132, and push notification server 134 (all shown in FIG. 1).

Exemplary Client Device

Figure 4:
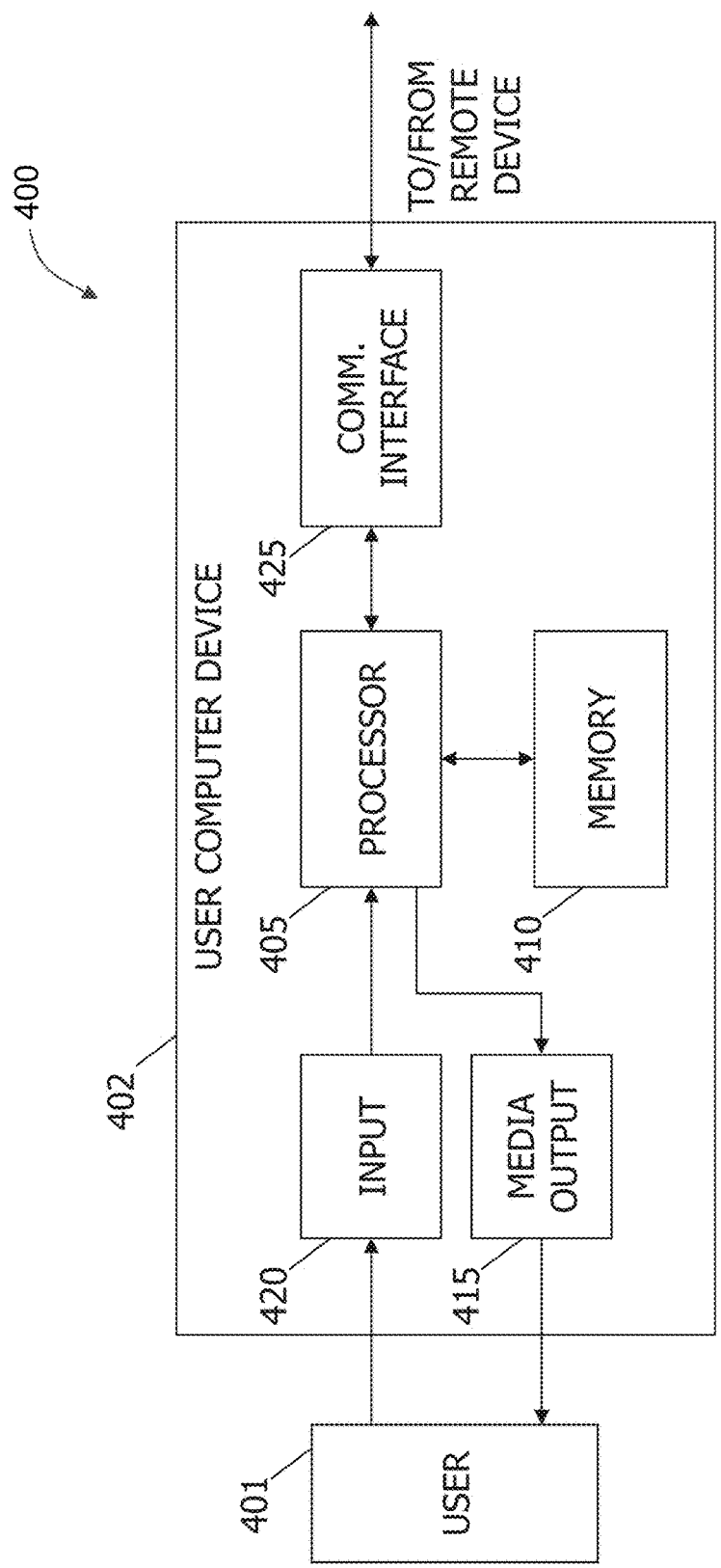
FIG. 4 illustrates an exemplary configuration of a user computer device, in accordance with one aspect of the present disclosure.

FIG. 4 depicts an exemplary configuration 400 of user computer device 402, in accordance with one embodiment of the present disclosure. User computer device 402 may be operated by a user 401. User computer device 402 may include, but is not limited to, broadcaster computer devices 106, receiver computer devices 108 (both shown in FIG. 1), channel owner computer devices 325, and subscriber computer devices 305 (shown in FIG. 3). User computer device 402 may include a processor 405 for executing instructions. In some embodiments, executable instructions may be stored in a memory area 410. Processor 405 may include one or more processing units (e.g., in a multi-core configuration). Memory area 410 may be any device allowing information such as executable instructions and/or transaction data to be stored and retrieved. Memory area 410 may include one or more computer readable media.

User computer device 402 may also include at least one media output component 415 for presenting information to user 401. Media output component 415 may be any component capable of conveying information to user 401. In some embodiments, media output component 415 may include an output adapter (not shown) such as a video adapter and/or an audio adapter. An output adapter may be operatively coupled to processor 405 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 415 may be configured to present a graphical user interface (e.g., a web browser and/or a client application) to user 401. A graphical user interface may include, for example, an interface for viewing notifications about audio messages available. In some embodiments, user computer device 402 may include an input device 420 for receiving input from user 401. User 401 may use input device 420 to, without limitation, select and/or enter one or more items of information about an audio message.

Input device 420 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 415 and input device 420.

User computer device 402 may also include a communication interface 425, communicatively coupled to a remote device such as AM computer device 310 (shown in FIG. 3). Communication interface 425 may include, for example, a wired or wireless network adapter and/or a wireless data transceiver for use with a mobile telecommunications network.

Stored in memory area 410 are, for example, computer readable instructions for providing a user interface to user 401 via media output component 415 and, optionally, receiving and processing input from input device 420. A user interface may include, among other possibilities, a web browser and/or a client application. Web browsers enable users, such as user 401, to display and interact with media and other information typically embedded on a web page or a website from AM computer device 310. A client application may allow user 401 to interact with, for example, AM computer device 310. For example, instructions may be stored by a cloud service, and the output of the execution of the instructions sent to the media output component 415.

Exemplary Server Device

Figure 5:
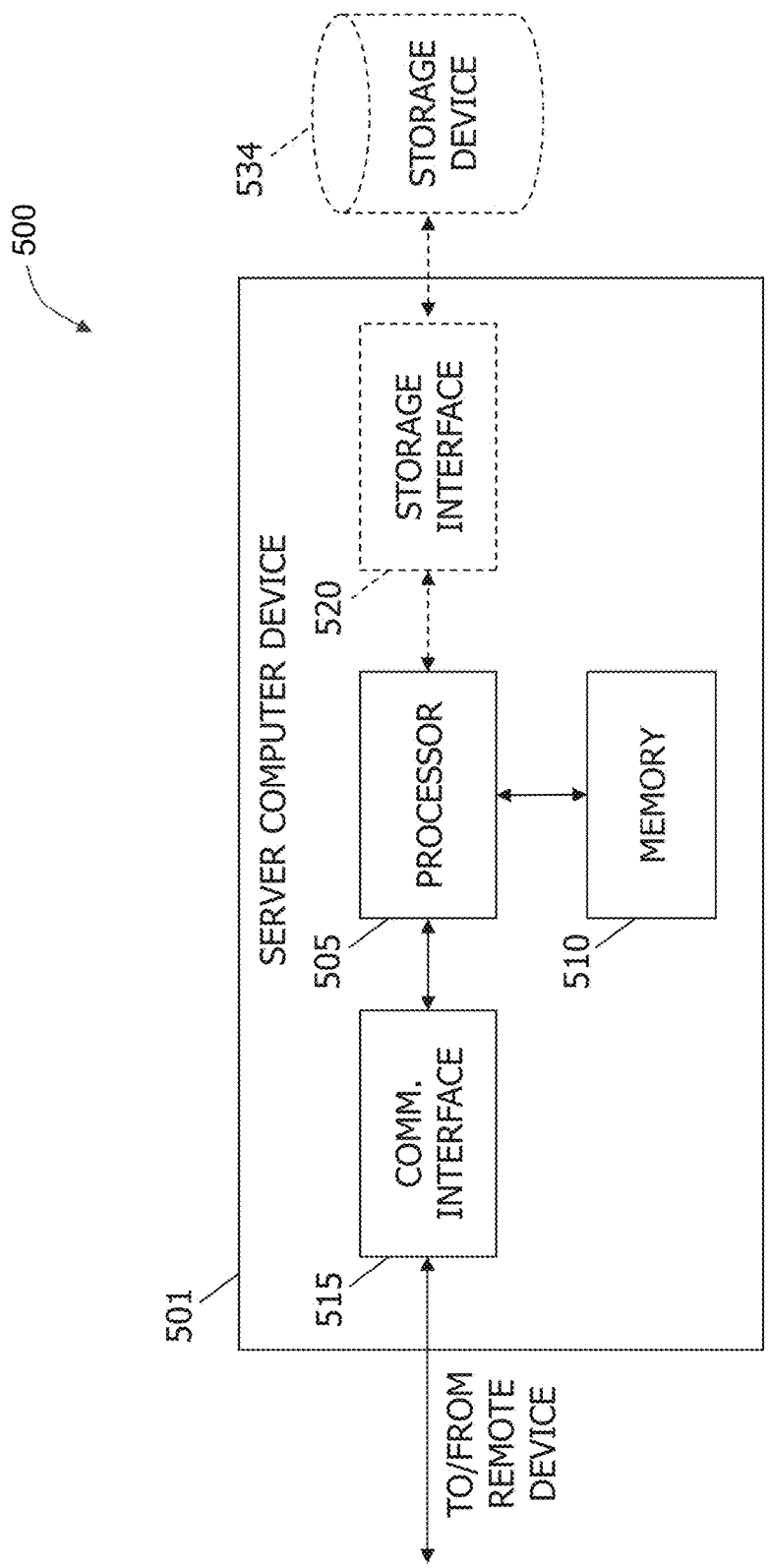
FIG. 5 illustrates an exemplary configuration of a server computer device, in accordance with one aspect of the present disclosure.

FIG. 5 depicts an exemplary configuration 500 of a server computer device 501, in accordance with one embodiment of the present disclosure. In the exemplary embodiment, server computer device 501 may be similar to, or the same as, AM computer device 310 (shown in FIG. 3). Server computer device 501 may include, but is not limited to, primary application server 118, secure signing server 132, push notification server 134 (all shown in FIG. 1), AM computer device 310, and database server 315 (shown in FIG. 3). Server computer device 501 may also include a processor 505 for executing instructions. Instructions may be stored in a memory area 510. Processor 505 may include one or more processing units (e.g., in a multi-core configuration).

Processor 505 may be operatively coupled to a communication interface 515 such that server computer device 501 is capable of communicating with a remote device such as another server computer device 501, AM computer device 310, subscriber computer devices 305, and channel owner computer devices 325 (both shown in FIG. 3) (for example, using wireless communication or data transmission over one or more radio links or digital communication channels). For example, communication interface 515 may receive requests from channel owner computer devices 325 via the Internet, as illustrated in FIG. 3.

Processor 505 may also be operatively coupled to a storage device 534. Storage device 534 may be any computer-operated hardware suitable for storing and/or retrieving data, such as, but not limited to, data associated with database 320 (shown in FIG. 3). In some embodiments, storage device 534 may be integrated in server computer device 501. For example, server computer device 501 may include one or more hard disk drives as storage device 534.

In other embodiments, storage device 534 may be external to server computer device 501 and may be accessed by a plurality of server computer devices 501. For example, storage device 534 may include a storage area network (SAN), a network attached storage (NAS) system, and/or multiple storage units such as hard disks and/or solid state disks in a redundant array of inexpensive disks (RAID) configuration.

In some embodiments, processor 505 may be operatively coupled to storage device 534 via a storage interface 520. Storage interface 520 may be any component capable of providing processor 505 with access to storage device 534. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 534.

Processor 505 may execute computer-executable instructions for implementing aspects of the disclosure. In some embodiments, the processor 505 may be transformed into a special purpose microprocessor by executing computer-executable instructions or by otherwise being programmed. For example, the processor 505 may be programmed with the instruction such as illustrated in FIGS. 1 and 2.

Exemplary Computer Device

Figure 6:
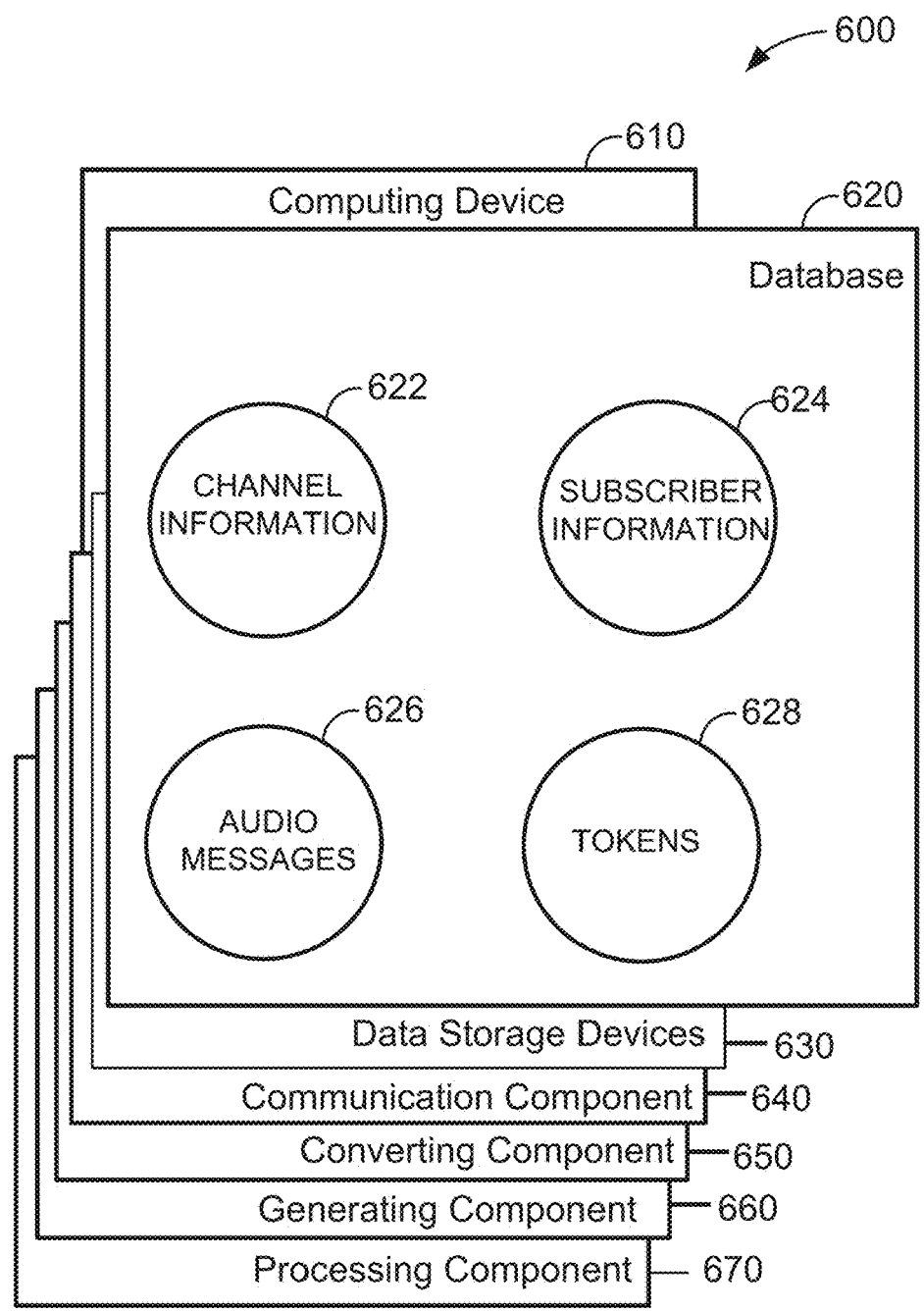
FIG. 6 illustrates a diagram of components of one or more exemplary computing devices that may be used in the system shown in FIG. 3.

FIG. 6 depicts a diagram 600 of components of one or more exemplary computing devices 610 that may be used in system 300 shown in FIG. 3. In some embodiments, computing device 610 may be similar to AM computer device 310. Database 620 may be coupled with several separate components within computing device 610, which perform specific tasks. In this embodiment, database 620 may include the channel information 622, subscriber information 624, audio messages 626, and tokens 628. In some embodiments, database 620 is similar to database 320 (shown in FIG. 3).

Computing device 610 may include the database 620, as well as data storage devices 630. Computing device 610 may also include a communication component 640 for receiving 210 a first audio message, transmitting 230 a first notification, receiving 225 a second audio message, and transmitting 240 a second notification (all shown in FIG. 2). Computing device 610 may further include a converting component 650 for converting 215 the first audio message (shown in FIG. 2). Moreover, computing device 610 may include a generating component 660 for generating 225 a first notification (shown in FIG. 2). A processing component 670 may assist with execution of computer-executable instructions associated with the system.

Additional Considerations

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

As used herein, the term "database" may refer to either a body of data, a relational database management system (RDBMS), or to both. As used herein, a database may include any collection of data including hierarchical databases, relational databases, flat file databases, object-relational databases, object-oriented databases, and any other structured or unstructured collection of records or data that is stored in a computer system. The above examples are not intended to limit in any way the definition and/or meaning of the term database. Examples of RDBMS's include, but are not limited to, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, New York; Microsoft is a registered trademark of Microsoft Corporation, Redmond, Wash.; and Sybase is a registered trademark of Sybase, Dublin, Calif.)

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. A computer system for recording and broadcasting audio messages between users, the computer system including at least one processor in communication with at least one memory device including a database, the at least one processor is programmed to:
store, in the database, a plurality of channel data for a plurality of channels, wherein each channel is associated with a channel owner and one or more subscribers, and wherein the plurality of channel data includes data about a channel owner computer device associated with the channel owner and one or more subscriber computer devices associated with the one or more subscribers;
receive, from the channel owner computer device, a first audio message;
convert the first audio message for storage;
store, in the database, the first audio message in a first channel of the plurality of channels in a first location, wherein the first channel is associated with the channel owner;
generate a first notification about the first audio message including the first location of the first audio message;
transmit the first notification to the one or more subscriber computer devices of the first channel;
receive, from a subscriber computer device associated with a subscriber of the first channel, a second audio message in response to the first audio message; and
transmit a second notification to the channel owner computer device wherein the second notification includes a second location of the second audio message.

2. A computer system in accordance with claim 1, wherein the second audio message is a public message, and wherein the at least one processor is further programmed to transmit the second notification to the one or more subscriber computer devices of the first channel and the channel owner computer device, wherein the second notification includes the second location of the second audio message.

3. A computer system in accordance with claim 1, wherein the at least one processor is further programmed to:
receive the first audio message in a first audio format;
convert the first audio message into a second audio format; and
store the first audio message in the second audio format.

4. A computer system in accordance with claim 3, wherein the at least one processor is further programmed to compress the first audio message prior to storing.

5. A computer system in accordance with claim 3, wherein the at least one processor is further programmed to optimize the first audio message for audio quality prior to storing.

6. A computer system in accordance with claim 1, wherein the at least one processor is further programmed to:
receive a third audio message in response to the second audio message from one of the channel owner computer device and one or more the subscriber computer devices; and
transmit a third notification to at least one of the one or more subscriber computer devices of the first channel and the channel owner computer device, wherein the third notification includes a third location of the third audio message.

7. A computer system in accordance with claim 1, wherein the first audio message includes metadata, and wherein the at least one processor is further programmed to:
generate a first token for the first audio message based on the first location and the metadata associated with the first audio message; and
generate an individual notification for each subscriber of the one or more subscribers of the first channel including a unique version of the first token based on a subscriber computer device associated with the corresponding subscriber, wherein the unique version of the first token allows the corresponding subscriber to access the first audio message.

8. A computer system in accordance with claim 7, wherein the at least one processor is further programmed to transmit the unique version of the first token in the first notification.

9. A computer system in accordance with claim 1, wherein the first audio message includes metadata, and wherein the at least one processor is further programmed to:
store a plurality of sub-channels associated with the first channel; and
store the first audio message in one of the plurality of sub-channels based on at least one of the metadata and a user selection.

10. A computer system in accordance with claim 1, wherein each of the subscriber computer devices are configured to:
display the first notification to the associated subscriber;
receive, from the associated subscriber, a selection of the first audio message;
retrieve the first audio message from the database; and
play, via an audio device associated with the corresponding subscriber computer device, the first audio message.

11. A computer-implemented method for recording and broadcasting audio messages between users, the method implemented on a computer system including at least one processor in communication with at least one memory device including a database, the method comprising:
storing, in the database, a plurality of channel data for a plurality of channels, wherein each channel is associated with a channel owner and one or more subscribers, and wherein the plurality of channel data includes data about a channel owner computer device associated with the channel owner and one or more subscriber computer devices associated with the one or more subscribers;
receiving, from the channel owner computer device, a first audio message;
converting the first audio message for storage;
storing, in the database, the first audio message in a first channel of the plurality of channels in a first location, wherein the first channel is associated with the channel owner;
generating a first notification about the first audio message including the first location of the first audio message;
transmitting the first notification to the one or more subscriber computer devices of the first channel;

receiving, from a subscriber computer device associated with a subscriber of the first channel, a second audio message in response to the first audio message; and transmitting a second notification to the channel owner computer device wherein the second notification includes a second location of the second audio message.

12. A method in accordance with claim 11, wherein the second audio message is a public message, and wherein the method further comprises transmitting the second notification to the one or more subscriber computer devices of the first channel and the channel owner computer device, wherein the second notification includes the second location of the second audio message.

13. A method in accordance with claim 11, wherein converting the first audio message for storage further comprises:

receiving the first audio message in a first audio format;
converting the first audio message into a second audio format; and
storing the first audio message in the second audio format.

14. A method in accordance with claim 11 further comprising:

receiving a third audio message in response to the second audio message from one of the channel owner computer device and one or more the subscriber computer devices; and transmitting a third notification to at least one of the one or more subscriber computer devices of the first channel and the channel owner computer device, wherein the third notification includes a third location of the third audio message.

15. A method in accordance with claim 11, wherein the first audio message includes metadata, and wherein the method further comprises:

generating a first token for the first audio message based on the first location and the metadata associated with the first audio message;

generating an individual notification for each subscriber of the one or more subscribers of the first channel including a unique version of the first token based on a subscriber computer device associated with the corresponding subscriber, wherein the unique version of the first token allows the corresponding subscriber to access the first audio message; and transmitting the unique version of the first token in the first notification.

16. At least one non-transitory computer-readable storage media having computer-executable instructions embodied thereon, wherein when executed by at least one processor in communication with at least one memory device include a database, the computer-executable instructions cause the processor to:

store, in the database, a plurality of channel data for a plurality of channels, wherein each channel is associated with a channel owner and one or more subscribers, and wherein the plurality of channel data includes data about a channel owner computer device associated with the channel owner and one or more subscriber computer devices associated with the one or more subscribers;

receive, from the channel owner computer device, a first audio message;

converting the first audio message for storage;

store, in the database, the first audio message in a first channel of the plurality of channels in a first location, wherein the first channel is associated with the channel owner;

generate a first notification about the first audio message including the first location of the first audio message;

transmit the first notification to the one or more subscriber computer devices of the first channel;

receive, from a subscriber computer device associated with a subscriber of the first channel, a second audio message in response to the first audio message; and transmit a second notification to the channel owner computer device wherein the second notification includes a second location of the second audio message.

17. The computer-readable storage media of claim 16, wherein the second audio message is a public message, and wherein the computer-executable instructions further cause the processor to transmit the second notification to the one or more subscriber computer devices of the first channel and the channel owner computer device, wherein the second notification includes the second location of the second audio message.

18. The computer-readable storage media of claim 16, wherein the computer-executable instructions further cause the processor to:

receive the first audio message in a first audio format;
convert the first audio message into a second audio format; and
store the first audio message in the second audio format.

19. The computer-readable storage media of claim 16, wherein the computer-executable instructions further cause the processor to:

receive a third audio message in response to the second audio message from one of the channel owner computer device and one or more the subscriber computer devices; and transmit a third notification to at least one of the one or more subscriber computer devices of the first channel and the channel owner computer device, wherein the third notification includes a third location of the third audio message.

20. The computer-readable storage media of claim 16, wherein the first audio message includes metadata, wherein the computer-executable instructions further cause the processor to:

generate a first token for the first audio message based on the first location and the metadata associated with the first audio message; and generate an individual notification for each subscriber of the one or more subscribers of the first channel including a unique version of the first token based on a subscriber computer device associated with the corresponding subscriber, wherein the unique version of the first token allows the corresponding subscriber to access the first audio message; and transmit the unique version of the first token in the first notification.

* * * * *